(12) United States Patent
Yap et al.

(10) Patent No.: US 6,922,845 B2
(45) Date of Patent: Jul. 26, 2005

(54) MULTI-PROCESSOR DVR

(75) Inventors: Adrian Yap, Gaithersburg, MD (US); Michael Ficco, Silver Spring, MD (US); Robert Davis, Woodbine, MD (US)

(73) Assignee: The DirectTV Group, Inc., El Segundo, CA (US)

( * ) Notice: Subject to any disclaimer, the term of this patent is extended or adjusted under 35 U.S.C. 154(b) by 885 days.

(21) Appl. No.: 09/761,202

(22) Filed: Jan. 17, 2001

(65) Prior Publication Data

US 2001/0052130 A1 Dec. 13, 2001

Related U.S. Application Data

(60) Provisional application No. 60/199,438, filed on Apr. 25, 2000.

(51) Int. Cl.[7] .................................................. H04N 7/16
(52) U.S. Cl. ..................... 725/141; 725/142; 386/68; 386/83
(58) Field of Search ................. 725/140, 37, 139, 725/40, 141, 31, 142, 109, 110; 386/68, 70, 46, 94, 111–112, 83; 718/100; H04N 7/16

(56) References Cited

U.S. PATENT DOCUMENTS 5,828,416 A    10/1998  Ryan 6,233,389 B1 *  5/2001  Barton et al. ................. 386/68
6,298,370 B1 * 10/2001  Tang et al. ................. 718/100

FOREIGN PATENT DOCUMENTS

EP            0 840 512 A2       3/1997

OTHER PUBLICATIONS

J.L. Droitcourt, LSI Logic, France, "Integra Architecture– Anatomy Of The Interactive Television Set–Top Box, How It Works, And What It Means To The Consumer" International Broadcasting Convention, Sep. 12–16, 1996.

* cited by examiner

*Primary Examiner*—Vincent Boccio
(74) *Attorney, Agent, or Firm*—Georgann S. Grunebach

(57) ABSTRACT

A set top box (STB) includes multiple processors that handle either real time or non-real time functions within the STB. One of the processors may perform substantially all of the real time operations, such as control of a data pipeline to the STB, conditional access, and control of a program guide stored within the DVR. The other processor may control substantially all non-real time functions that are executed within the STB, such as graphics user interface and browser functions. The STB may be embodied as a digital video recorder (DVR). The additional processor(s) provide for increased overall system bandwidth, improved system security and greater system stability for an STB and/or DVR configured with these multiple processors, as compared to a conventional STB having a single micro-controller or processor.

42 Claims, 7 Drawing Sheets

MULTI-PROCESSOR DVR

RELATED APPLICATION(S)

This application claims the benefit under 35 U.S.C. Section 119(e) of a U.S. Provisional Patent Application by Adrian Yap et al. entitled "DIGITAL VIDEO RECORDER", Ser. No. 60/199,438, filed on Apr. 25, 2000, the entire contents of which is incorporated by reference.

BACKGROUND OF THE INVENTION

1. Technical Field of the Invention

This invention generally relates to applications and features related to a digital video-recording device (DVR). More particularly, the present invention is directed to a DVR having multiple processors.

2. Description of Related Art

Conventional communications systems may include a receiver for receiving and processing transmitted waveforms. For example, in a satellite communications system, the receiver may include a small satellite dish connected by a cable to a set-top box (STB) or an integrated receiver-decoder (IRD), which are used as interchangeable terms in the art. The satellite dish is aimed toward the satellites, and the STB is connected to the user's television in a similar fashion to a conventional cable-TV decoder.

A micro-controller controls the overall operation of the STB, including the selection of parameters, the set-up and control of components, channel selection, viewer access to different programming packages, blocking certain channels, and many other functions. The compression and decompression of packetized video signals may be accomplished according to the Motion Picture Expert Group (MPEG) standards and the compression and decompression of audio signals may be accomplished according to the Motion Picture Expert Group (MPEG) standards, DOLBY DIGITAL (or AC-3) standards, DTS or other known standards. The conventional STB also typically includes video and audio decoders in order to decompress the received compressed video and audio. The STB may output video and audio data to a number of destinations, including audio and video decoders, ports, memories, and interface devices, such as a digital VHS (DVHS) interface. The STB may send the same audio and video data to different destinations.

More recently, due to the advances in digital technology and with a goal of creating greater personalized television for viewers, the STB has become embodied as part of a digital VCR (DVCR) and/or digital VHS (DVHS) receiver for example, in the continuing development of digital video recording devices used within the wireless television system described above. These devices incorporate a host of both traditional and powerful new features. For example, these features may include high quality digital A/V, the ability to pause/rewind live video and/or audio programs as they are broadcast, multi-speed fast forward and fast rewind, instant replay, slow motion and frame by frame advance. Additionally, the viewer may have access to, and have the ability to manipulate or develop an electronic program guide of listings.

Such digital video recording devices allow sports fans and movie buffs alike to have full control of live television programs and sporting events in full digital-quality. Viewers may also be able to create customized programming by searching for, and recording, programs that match their preferences by actor, director, keyword or any combination of content searches. Combined with the wide variety of program selections, viewers may find exactly what they are looking for and even create their own "TV channels" based on their favorite programming.

The electronic program guides generally are displayed as a menu on a screen of a TV for example. Operation of push buttons or keys of a remote control may display a series of menu screens having an array of cells corresponding to particular programming events, channels, TV programs, etc. The viewer may scroll through the cells to choose a particular program, pull up another sub menu to find out more information on a particular program, or pull up a sub menu with additional options.

These functions are controlled by a single processor or micro-controller, such as a CPU of a computer that is connected to a TV, DVCR or DVHS, or by a single microprocessor or micro-controller embedded within the DVCR or DVHS. However, the costs of modern microprocessors are now falling due in part by fast-moving advances in micro-technologies. Accordingly, it is fast becoming feasible to dedicate individual processors for specific tasks within a mass-marketed consumer product. In particular, a variety of functions performed by a digital STB might be well suited to distribution amongst a plurality of task-specific processors.

SUMMARY OF THE INVENTION

The present invention is directed to a digital set top box (STB) having multiple processors that handle both real time and non-real time functions within the STB. In an embodiment, one of the processors performs substantially all of the real time operations, such as control of a data pipeline to the STB, conditional access, and control of a program guide stored within the STB. The other processor controls substantially all non-real time functions that are executed within the STB, such as presentation of a graphical user interface (GUI), browser functions, and general interaction with a user of the STB. In an embodiment, the STB is equipped with or embodied as a digital video recorder (DVR) having multiple processors therein.

The additional processor(s) provide for increased overall system bandwidth, improved system security and greater system stability for an STB and/or DVR configured with these multiple processors, as compared to conventional STB having a single micro-controller or processor. Additionally, the quality of the architecture and/or modularity of a multi-processor STB or DVR are improved over its single-processor brethren.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
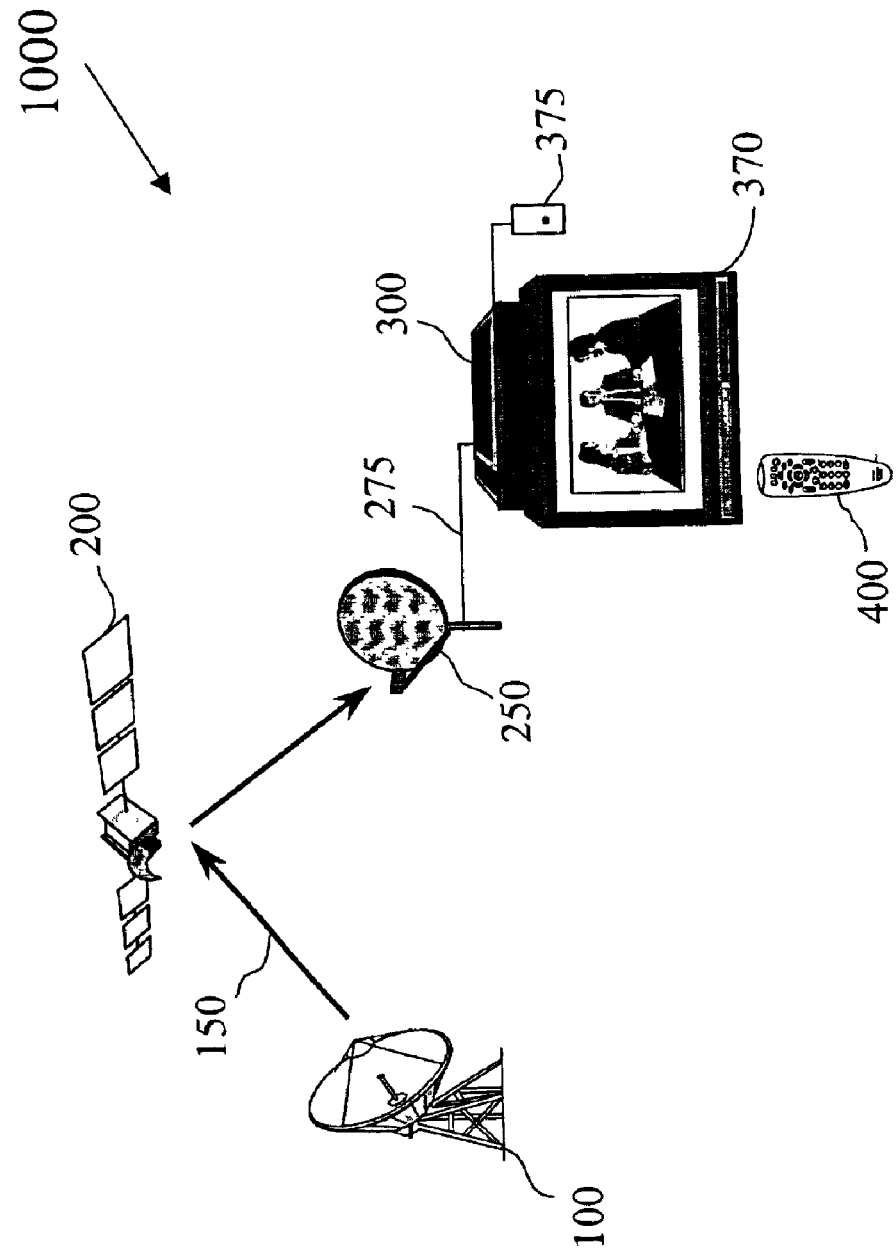
FIG. 1 is an exemplary arrangement of a set-top box (STB) within a direct broadcast satellite or digital video broadcast system in accordance with the invention.

In accordance with the invention, there is a digital STB that includes a first processor which performs essentially all of the real time operations, such as control of a data pipeline to the STB, conditional access, and control of a program guide stored within the STB. A second processor operatively connected to the first via a data bus controls essentially all non-real time functions that are executed within the STB, such as graphical user interface (GUI) and browser functions, for example. In an embodiment, the STB may be embodied as a digital video recorder (DVR) having multiple processors that are slated for essentially real-time operations or functions, or essentially non-real time operations or functions.

The STB may be operatively connected to, or embodied within, a digital satellite broadcast system, direct video broadcast system, cable TV system, off-air broadcast system or other known broadcast system. One may expect that the addition of one or more processors would increase the available system bandwidth of the STB. However, this increase may not be solely due to the power provided by the additional processor(s). A single processor consisting of or having the aggregate power capabilities of two or "N" processors would not be as efficient as a system with multiple individual processors dedicated to specific tasks. In part, this is due to the overhead associated with switching between tasks, and also due to the need to resolve conflicts when multiple tasks or functions are submitted to the processor (i.e., by instructions or commands) at the same time.

For example, the demands of real time events, broadcasts or programs that are processed by the STB and/or DVR may often conflict with each other. In the present invention, one processor may handle reception of remote IR commands for various functions related to the manipulation of the real time events, broadcasts or programs, while another processor receives satellite-transmitted (or cable-transmitted or off-air broadcast-transmitted) program guide data. It would be disadvantageous if either the IR transmission or the satellite transmission were stopped while the processor pays attention to something else. Even if the data were buffered until a processor was available, this would still be undesirable as latency would increase, ultimately constraining the processor to respond before the available buffering capacity is exceeded. This is a case, considered by the inventors in light of the present invention, where multiple processors may be dedicated to specific tasks in order to avoid the aforementioned pitfalls, so as to increase overall system bandwidth.

Additionally, separate processors executing code in separated memories and/or segmented memory segments, in accordance with the present invention, may also increase system security. For example, decryption algorithms could be hidden from the prying eyes of application developers by executing the security codes on a different processor.

Further, the present invention provides greater stability in that if incorrect code or unexpected circumstances disrupt the operation of one processor in the STB or DVR, another processor may continue operation unaffected by the disrupted processor. In this way, multiple processor STB or DVR systems can be made more robust as compared to the single micro-controller STB. Moreover, dividing functions amongst multiple processors provides an opportunity to improve the quality of system architecture. The hard separation between processors encourages the implementation of well-defined interfaces between the various operations running on the STB platform, for example.

However, before describing the multi-processor-features in greater detail, the inventors offer a general discussion on an exemplary satellite-based distribution system envisioned for the present invention, and more specifically discuss a set-top box (STB) equipped with a digital video recorder (DVR) within a direct broadcast satellite or digital video broadcast (DVB) system. Additionally, the basic architecture and operation of the STB or STB-equipped with DVR is explained in order to provide a context for the multi-processor configuration of the present invention.

In general, television signal distribution systems generally rely on either a cable network or on free-space propagation for delivering television signals to individual users or subscribers. Cable-based television systems transmit one or more individual television signals or "channels" over wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas. An example of a land-based "cellular" type television signal distribution system is disclosed in Bossard, U.S. Pat. No. 4,747,160. This system includes multiple television signal transmitting stations, each of which transmits a television signal to individual receivers spread throughout a limited geographic region, and is configured so that adjacent transmitting stations use modulation and frequency diversity to prevent interference.

Some cellular systems, such as those commonly referred to as LMDS (local multi-point distribution system) and MMDS (multi-channel, multi-point distribution system), use a land-based cellular-type transmitting setup to rebroadcast satellite signals at frequencies different than the frequencies used by the satellite. Each of the transmitters of an LMDS system typically transmits within a one to five mile radius cell while each of the transmitters of an MMDS system typically transmits within an approximately 30-mile radius cell.

The present invention may be embodied in a satellite-based distribution system. The system generally includes an earth station that compiles a number of programs (video and audio) into a broadband signal, modulates a carrier frequency band with the broadband signal and then transmits (uplinks) the modulated signal to a geosynchronous satellite via a transmit antenna. The satellite amplifies the received signal, shifts the signal to a different carrier frequency band and transmits (downlinks) the frequency shifted signal to earth for reception at individual receiver stations.

The uplink and downlink broadband signals of the disclosed satellite distribution system may be divided into a plurality of transponder signals, each having a plurality of individual channels. For example, analog satellite systems operating in the so-called "G-band," i.e., between about 3.7 GHz and about 4.2 GHz, typically broadcast ten (10)-500 MHz-wide transponder signals, with each transponder signal further including twelve, 40 MHz-wide analog channels. Satellite systems may also broadcast a set of transponder signals at multiple polarizations, for example, a right-hand circular polarization (RHCP) and a left-hand circular polarization (LHCP), within the band of carrier frequencies associated with the satellite; effectively doubling the number of channels broadcast by the system.

Satellite-based signal distribution systems exist for many frequency bands, including the so-called "Ku-band" which ranges from approximately 12 GHz to approximately 18 GHz. The preferred embodiment of the present invention uses an uplink signal having 16 RHCP transponder signals and 16 LHCP transponder signals modulated into the frequency band between about 17.2 GHz and about 17.7 GHz. Each of these 32 transponder signals includes data packets related to approximately 10 individual television channels associated therewith. The satellites shift the uplink transponder signals to carrier frequencies ranging from approximately 11.7 GHz to approximately 12.2 GHz and transmit these frequency-shifted transponder signals back to earth for reception at each of a plurality of individual receiver stations.

Each receiver station may include an antenna coupled to a STB that is equipped with a digital video recorder (DVR). In another embodiment, the STB may have interface circuitry coupled thereto for connection to an external digital peripheral unit such as a storage medium. The antenna may comprise a parabolic dish antenna such as an outdoor unit (ODU) for example, pointed in the general direction of the transmitting satellite (or other transmitting location) to thereby receive the broadband signal. Such antennas may also include a low-noise block (LNB) downconverter, which filters and shifts the incoming signal to an intermediate frequency band, such as L-band, which is between approximately 1.0 GHz and approximately 2.0 GHz. In one embodiment, the signal received from the satellite is shifted to the frequency band between approximately 950 MHz and approximately 1450 MHz.

Sometimes, only the RHCP transponder signals or the LHCP transponder signals are mixed down to L-band, depending on which channel a user is viewing. However, in systems having a two-channel LNB downconverter, both the RHCP and the LHCP transponder signals are shifted down to L-band and provided, via separate lines, to the receiver station.

Although the present invention will be explained in reference to a STB within a direct broadcast satellite or digital video broadcast (DVB) system, the STB and/or STB-equipped with DVR may function within any of a cable TV, off-air broadcast or other applicable or known and used communication-related and/or wireless digital-TV system.

FIG. 1 is an exemplary arrangement of a STB 300 equipped with a DVR within a direct broadcast satellite or digital video broadcast (DVB) system, in accordance with the present invention. In the exemplary embodiment of FIG. 1, the system 1000 may comprise a transmit antenna station (hereinafter referred to as uplink facility 100 for clarity), satellite 200, receive antenna 250 and STB 300 equipped with DVR.

The transmit antenna station may be a DIRECTV(r) satellite uplink facility, for example, or any other earth station as described above and which is well known in the art. The bitstream or airlink 150 is a suitable content signal such as a digital audio and video television data signal (A/V signal), the medium is a satellite 200, and the receive antenna 250 is preferably an outdoor unit (ODU). As illustrated in FIG. 1, the ODU is connected to STB 300 via coaxial cable 275.

In this exemplary embodiment, the DVR of the present invention is included in, or subsumed within STB 300. However, the invention is applicable to any STB having a multiple-processor configuration. STB 300 may further be connected to a display 370, such as a standard definition television, a high definition television or a PC monitor and also may be connected to a telephone line 375. The DVR-equipped STB 300 may be controlled via a remote control 400 as is well known in art, using known RF and/or IR transmission and reception techniques.

The user command interface in the present invention however is not limited to a remote control device. Alternatively, any of function buttons residing on the STB or DVR structure itself, a keyboard operatively connected thereto and/or connected to a PC that is in communication with the STB, USP serial ports, voice-activation software devices within or operatively connected to the STB, or command and/or instructions by remote call-in using DTMF tones for example, may be substituted as the user command interface to the STB or DVR.

Figure 2:
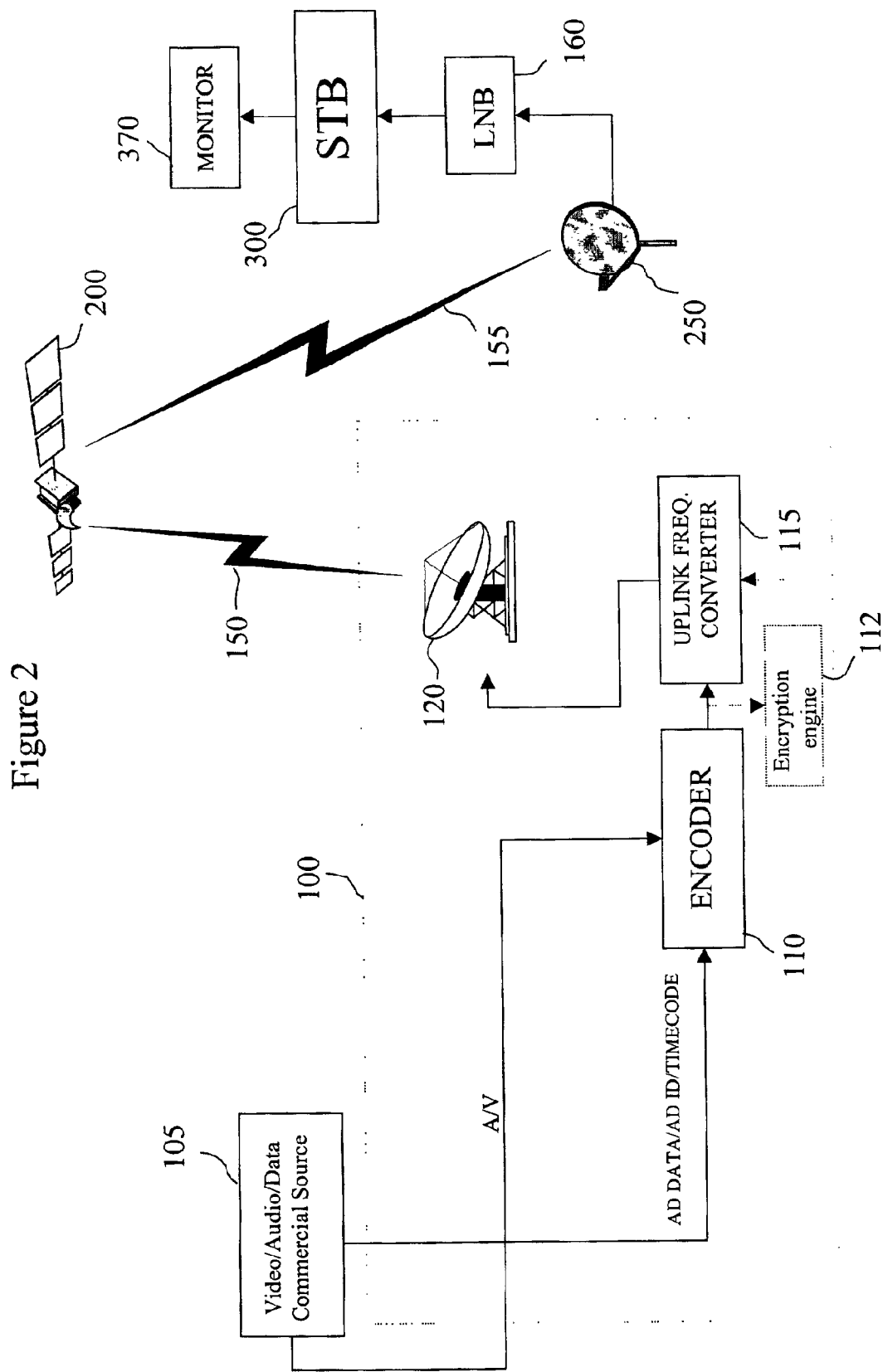
FIG. 2 illustrates a general data flow in a direct broadcast satellite or digital video broadcast system in accordance with the invention.

FIG. 2 illustrates the general data flow in a direct broadcast satellite or digital video broadcast system. In operation, the uplink facility 100 can receive video and audio programming from a number of sources, including satellites, terrestrial fiber optics, cable, or tape. Preferably, the received programming signals, along with data signals such as electronic scheduling data and conditional access data, are sent from some commercial source 105 to a video/audio/data encoding system 110 within uplink facility 100. Here, they are digitally encoded and multiplexed into a packetized data stream using a number of conventional algorithms, including convolution error correction and compression, for example.

In a conventional manner, the encoded data stream is modulated and sent through an uplink frequency converter 115 which converts the modulated encoded data stream to a frequency band suitable for reception by the satellite 200. Preferably, the satellite frequency is K-band such as in the Ku-band; however the frequency may be in the Ka band as well. The modulated, encoded data stream is then routed from the uplink frequency converter 115 to an uplink satellite antenna/dish 120, where it is broadcast toward the satellite 200 over the airlink 150. The encoded data stream may be encrypted and encoded, by a suitable encryption engine 112 (dotted lines), or not encrypted and encoded.

The satellite 200 receives the modulated, encoded Ku-band data stream via airlink 150, and re-broadcasts it downward via downlink 155 toward an area on earth that includes the various receiver stations (STB 300, for example). In this embodiment, the satellite dish (ODU 250) of STB 300 shifts the Ku-band signal down to an L-band signal which is transmitted via a LNB downconverter 160 to STB 300, for eventual reproduction on display monitor 370.

Front-end circuitry, which may or may not be part of STB 300, receives the L-band RF signals from the LNB downconverter 160 and converts them back into the original digital data stream. The front-end circuitry may include a tuner. Circuitry (shown and explained in more detail in FIG. 3) receives the original data streams via an input port and performs video/audio processing operations such as de-multiplexing and decompression. The overall operation of STB 300, including the selection of parameters, the set-up and control of components, channel selection, a user's access to different program packages, and many other functions, both real time and non-real time, are controlled by one or more processors within STB 300, as will be further explained below.

Figure 3:
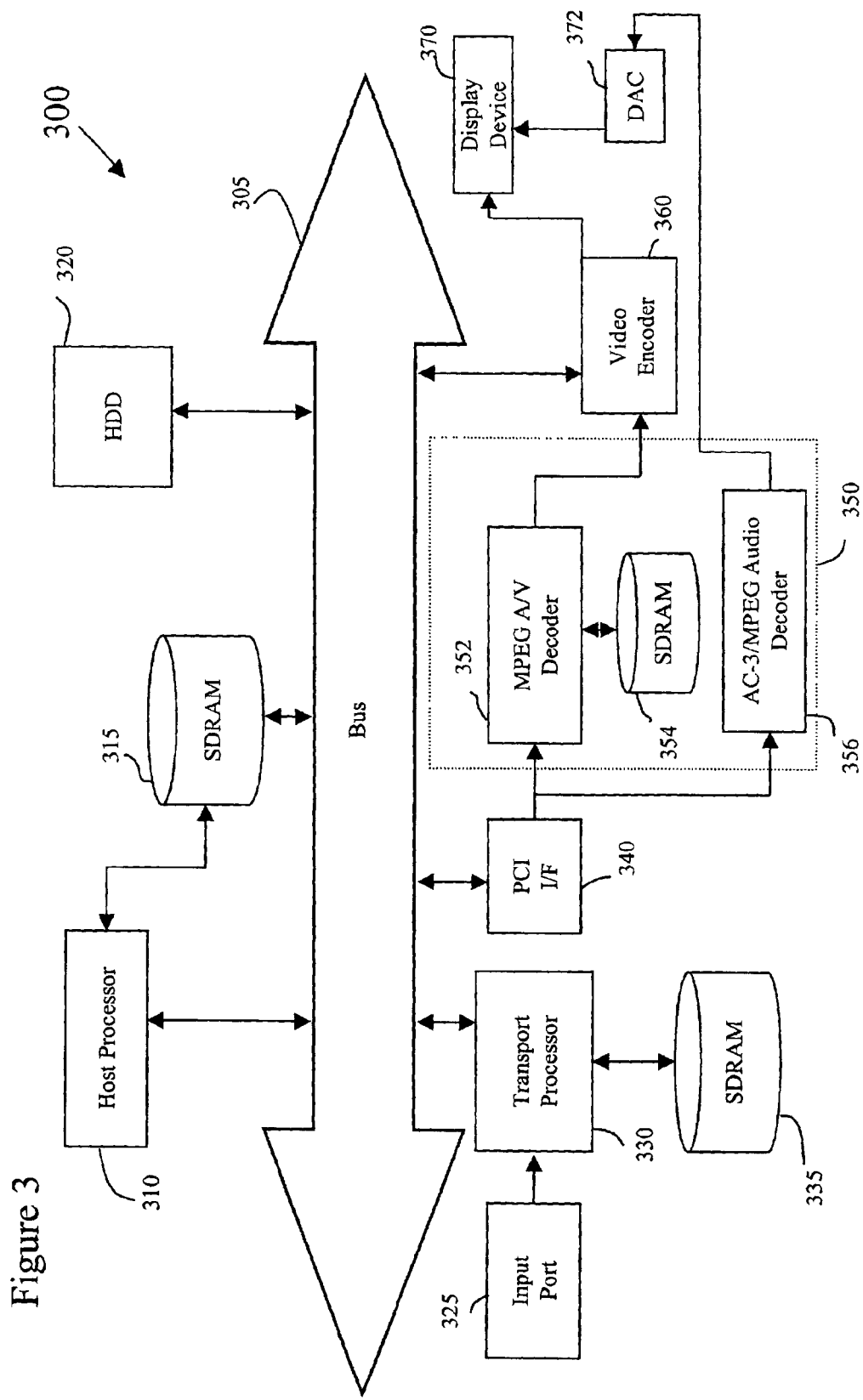
FIG. 3 is a block diagram of an exemplary architecture of the STB equipped with a digital video recorder (DVR) in accordance with the present invention.

FIG. 3 illustrates an exemplary architecture of the DVR-equipped STB 300 in accordance with the present invention. The STB 300 utilizes a bus 305 to interconnect various components and to provide a pathway for data and control signals.

FIG. 3 illustrates a host processor 310, a memory device 315 (in an exemplary configuration embodied as an SDRAM 315) and a hard disc drive (HDD) 320 connected to the bus 305. In this embodiment, the host processor 310 may also have a direct connection to SDRAM 315 as shown in FIG. 3 (i.e., such that SDRAM 315 is associated as the memory for host processor 310). Although memory device 315 is described as SDRAM 315 hereinafter in the present application, memory devices of EDO RAM (extended data output DRAM), BEDO RAM (Burst EDO RAM), RLDRAM by Rambus, Inc., SLDRAM by the SyncLink Consortium VRAM (video RAM), or any other known or developing memory that is writeable may be sufficient as memory device 315.

As further shown in FIG. 3, a transport processor 330 and PCI I/F 340 (peripheral component interconnect interface) are connected to the bus 305. The transport processor 330 also has a connection to input port 325 and SDRAM 335. SDRAM 335 has the same attributes as SDRAM 315 and may be replaced with any of the other above-noted alternative memory devices. Furthermore, the PCI I/F 340 is connected to a decoder 350. The decoder 350 is connected to a video encoder 360. The output of video encoder 360 is in turn sent to a display device 370. Decoder 350 may include both an MPEG A/V decoder 352 and an AC-3/MPEG audio decoder 356, the output of the latter being sent to display device 370 after conversion in a digital-to-analog converter (DAC) 372.

The host processor 310 may be constructed with conventional microprocessors such as the currently available PENTIUM(r) processors from Intel. Host processor 310 performs non real-time functions in the STB 300, such as graphical-user interface and browser functions. A browser is a software engine that presents the interface to, and interacts with, a user of the STB 300. The browser is responsible for formatting and displaying user-interface components and pictures. Typically, the user interface is displayed as a Graphical User Interface (GUI).

Browsers are often controlled and commanded by the standard HTML language, which is used to position and format the GUI. Additionally, or in the alternative, any decisions and control flow of the GUI that requires more detailed user interaction may be implemented using JavaScript(tm). Both of these languages may be customized or adapted for the specific details of a given STB 300 implementation, and images may be displayed in the browser using well known JPG, GIF and other standardized compression schemes. It is noted that other non-standardized languages and compression schemes may be used for the browser and GUI, such as XML, "home-brew" languages or other known non-standardized languages and schemes.

HDD 320 is actually a specific example of a mass storage device. In other words, the HDD 320 may be replaced with other mass storage devices as is generally known in the art, such as known magnetic and/or optical storage devices, (i.e., embodied as RAM, a recordable CD, a flash card, memory stick, etc.). In an exemplary configuration, HDD 320 may have a capacity of at least about 25 Gbytes, where preferably about at least 20 Gbytes is available for various recording applications, and the remainder flexibly allocated for pause applications in STB 300.

The bus 305 may be implemented with conventional bus architectures such as a peripheral component interconnect (PCI) bus that is standard in many computer architectures. Alternative bus architectures such as VMEBUS(r) from Motorola, NUBUS(r), address data bus, RAM bus, DDR (double data rate) bus, etc., could of course be utilized to implement bus 305.

The transport processor 330 performs real-time functions and operations such as control of the A/V data flow, conditional access, program guide control, etc., and may be constructed with an ASIC (application specific integrated circuit) that contains, for example, a general purpose R3000A MIPS RISC core, with sufficient on-chip instruction cache and data cache memory. Furthermore, the transport processor 330 may integrate system peripherals such as interrupt, timer, and memory controllers on-chip, including ROM, SDRAM, DMA controllers; a packet processor, crypto-logic, PCI compliant PC port, and parallel inputs and outputs. The implementation shown in FIG. 3 actually shows the SDRAM 335 as being separate from the transport processor 330, it being understood that the SDRAM 335 may be dispensed with altogether or consolidated with SDRAM 315. In other words, the SDRAMs 315 and 335 need not be separate devices and can be consolidated into a single SDRAM or other memory device.

The input port 325 receives audiovisual bitstreams that may include, for example, MPEG-1 and MPEG-2 video bitstreams, MPEG-1 layer 11 audio bitstreams and DOLBY DIGITAL (AC-3) audio bitstreams. Exemplary A/V bitrates may range from about 60 Kbps to 15 Mbps for MPEG video, from about 56–384 Kbps for MPEG audio, and between about 32–640 Kbps for AC-3 audio. The single-stream maximum bitrate for STB 300 may correspond to the maximum bitrate of the input programming, for example 16 Mbps or 2 MBps, which corresponds to the maximum MPEG-2 video bitrate of 15 Mbps, maximum MPEG-1 Layer-2 audio bitrate of 384 kbps, and maximum AC-3 bitrate of 640 kbps.

Any audio or video formats known to one of ordinary skill in the art could be utilized. Although FIG. 3 has been described in conjunction with digital television, the signal supplied could be any type of television signal, any type of audio or video data, or any downloadable digital information. Of course, various other audiovisual bitstream formats and encodation techniques may be utilized in recording. For example, STB 300 may record an AC-3 bitstream, if AC-3 broadcast is present, along with MPEG-1 digital audio. Still further, the received audiovisual data may be encrypted and encoded or not encrypted and encoded. If the audiovisual data input via the input port 325 to the transport processor 330 is encrypted, then the transport processor 330 may perform data decryption and transport processing. Moreover, the decryption may be performed instead by the host processor 310.

As mentioned above, the SDRAMs (315 and 335) may be consolidated or replaced with a single SDRAM or single memory device. The PCI I/F 340 may be constructed with an ASIC that controls data reads from memory. Audiovisual (A/V) data may be sent to the host processor 310's memory while simultaneously being sent to an MPEG A/V decoder 352, as further discussed below.

Decoder 350 may be constructed as shown in FIG. 3 by including the MPEG A/V decoder 352 connected to the PCI I/F 340, as well as an AC-3/MPEG audio decoder 356 which is also connected to the PCI I/F 340. In this way, the video and audio bitstreams from the PCI I/F 340 can be separately decoded by decoders 352 and 356, respectively. Alternatively, a consolidated decoder may be utilized that decodes both video and audio bitstreams together. The encoding techniques are not limited to MPEG and AC-3, of course, and can include any known or future developed encoding technique. In a corresponding manner, the decoder 350 could be constructed to process the selected encodation technique(s) utilized by the particular implementation desired.

In order to more efficiently decode the MPEG bitstream, the MPEG A/V decoder 352 may also include a memory device such as SDRAM 354 connected thereto. This SDRAM 354 may be eliminated, consolidated with decoder 352 or consolidated with the other SDRAMs 315 and/or 335. SDRAM 354 has the same attributes as SDRAM 315 and 335, and may be replaced with any of the other above-noted alternative memory devices.

Video encoder 360 in one embodiment may be an NTSC encoder that encodes, or converts the digital video output from decoder 350 into a coded analog signal for display. Regarding the specifications of the NTSC (National Television Standards Committee) encoder 360, the NTSC is responsible for setting television and video standards in the United States. The NTSC standard for television defines a composite video signal with a refresh rate of 60 half-frames (interlaced) per second. Each frame contains 525 lines and can contain 16 million different colors.

In Europe and the rest of the world, the dominant television standards are PAL (Phase Alternating Line) and SECAM (Sequential Color with Memory). Whereas NTSC delivers 525 lines of resolution at 60 half-frames per second, PAL delivers 625 lines at 50 half-frames per second. Many video adapters or encoders that enable computer monitors to be used as television screens support both NTSC and PAL signals. SECAM uses the same bandwidth as PAL but transmits the color information sequentially. SECAM runs on 625 lines/frame.

Thus, although use of a video encoder 360 is envisioned to encode the processed video for display on display device 370, the present invention is not limited to the NTSC standard encoder. PAL and SECAM encoders may also be utilized. Further, hi-definition television (HDTV) encoders may also be viable to encode the processed video for display on a HDTV, for example.

Display device 370 may be an analog or digital output device capable of handling a digital, decoded output from the video encoder 360. If analog output device(s) are desired, to listen to the output of the AC-3/MPEG audio decoder 356, a digital-to-analog converter (DAC) 372 is connected to the decoder 350. The output from DAC 372 is an analog sound output to display device 370, which may be a conventional television, computer monitor screen, portable display device or other display devices which are known and used in the art. If the output of the AC-3/MPEG audio decoder 356 is to be decoded by an external audio component, a digital audio output interface (not shown) may be included between the AC-3/MPEG audio decoder 356 and display device 370. The interface may be a standard interface known in the art such as a SPDIF audio output interface, for example, and may be used with, or in place of DAC 372, depending on whether the output devices are analog and/or digital display devices.

The video output from video encoder 360 and/or audio from audio decoder 356 or DAC 372 does not necessarily have to be sent to display device 370. Alternatively, encoded A/V data may be output to external devices or systems operatively connected to the STB 300, such an off-broadcast system, cable TV system or other known systems which can reproduce the encoded audio and/or video signals for reproduction and/or display. This may also include a PC that can play video or audio files containing the encoded A/V data sent from the STB 300, for example.

Figure 4:
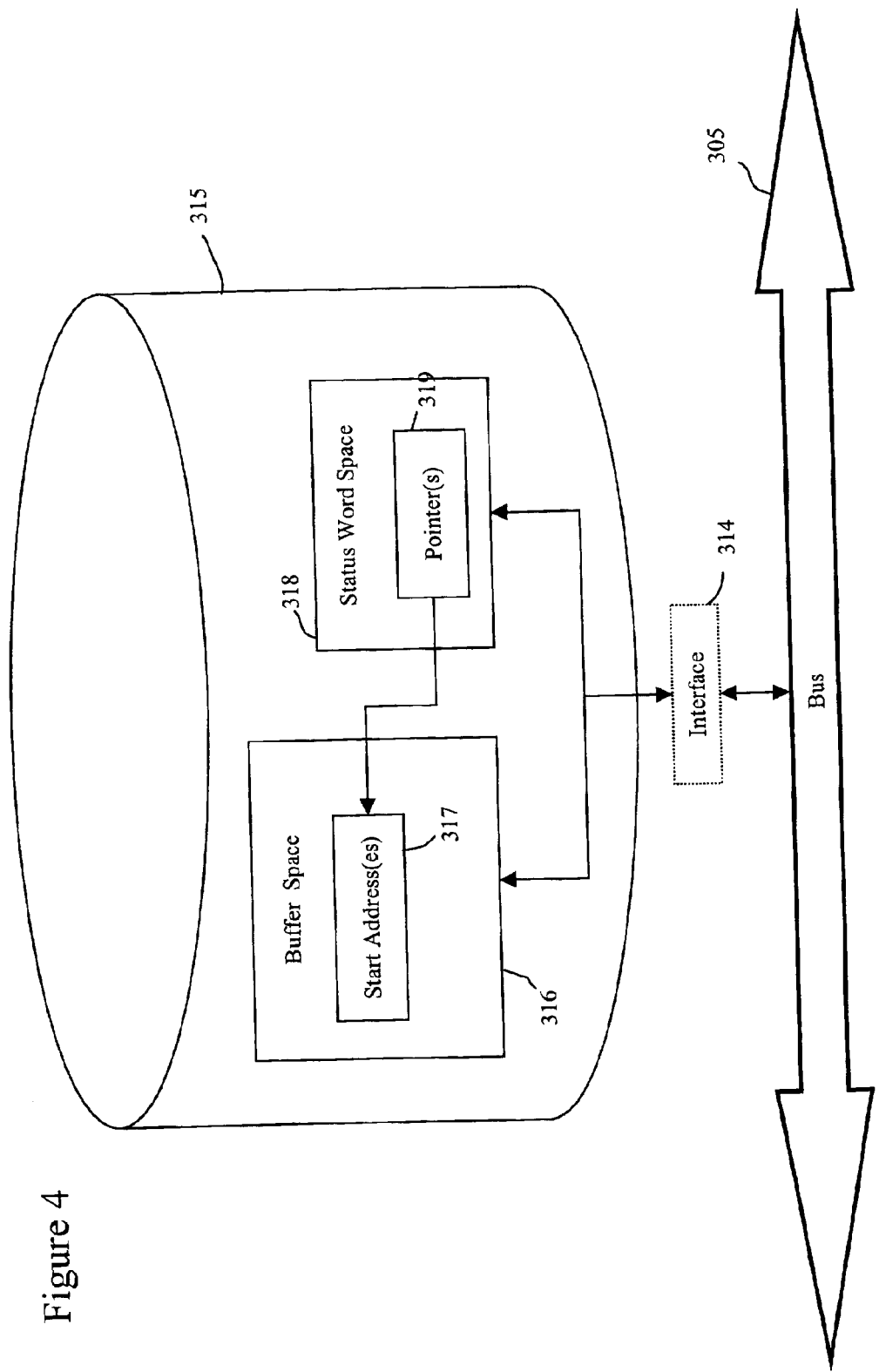
FIG. 4 is a block diagram showing an exemplary construction of a memory device according to an exemplary embodiment of the invention.

FIG. 4 illustrates various components that may be provided for the SDRAM 315. As mentioned above, the SDRAM shown in FIG. 3 is actually a specific implementation of a memory device. It is noted that the invention is not limited to this specific implementation of SDRAM 315 and can include any other known or future developed memory technology. Regardless of the technology selected, the memory device 315 may include a buffer space 316 which may be a fixed or virtual set of memory locations that buffers or otherwise temporarily stores audiovisual data. In practice, the video data may be stored separate from the audio data, but it would be possible to intermix these data types depending upon the particular application and coding techniques utilized for the audio and visual data.

The A/V data stored in the buffer space 316 includes one or more start addresses 317 which indicate the beginning memory address at which the audio and/or video data (A/V) is stored. If the A/V data is separately stored, then a plurality of stored addresses will be necessary. Furthermore, if there is more than one set of, or a block of data within the buffer spaces 316, then the start addresses 317 will individually point to each block of data.

The memory device 315 also includes a status word space 318. This status word space includes fixed or virtual addresses at which status words may be stored. An example of a status word that may be stored in the status word space 318 is a status word summarizing the status of a peripheral device. For example, the status word that may be stored within the status word space 318 may include the status of the host processor 310 or transport processor 330. The status word space 318 may also include pointers 319 that point to the start addresses 317 within the buffer space 316.

As further shown in FIG. 4, the SDRAM 315 may connect to the bus 305 via an interface 314. The dash lines indicate that the interface 314 is optional and may or may not be included depending upon the interface requirements of the particular memory device 315 and/or bus 305.

Figure 5:
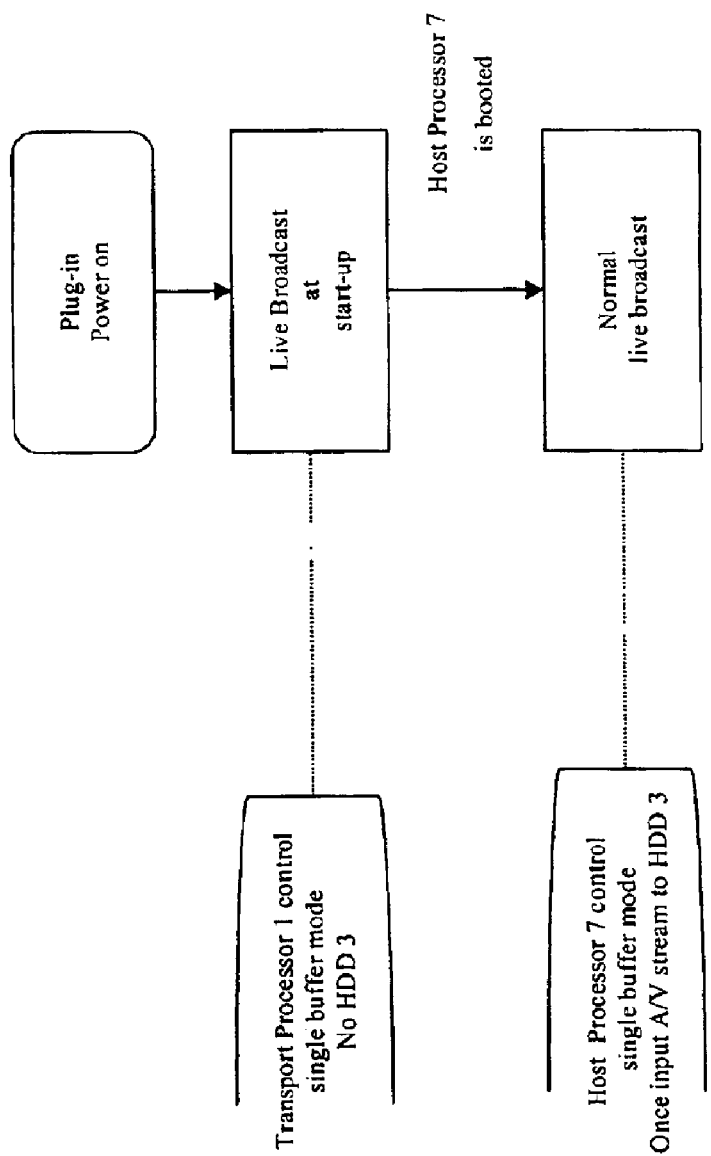
FIG. 5 is a flow chart illustrating the functions of a transport processor and host processor of the DVR for live broadcast modes of operation.

FIG. 5 is a flow chart illustrating the functions of the transport processor 330 and host processor 310 for live broadcast at startup and for a normal live broadcast. In order to overcome possible delay during plug-in power on, two signal flows may be supported for live broadcast, a live broadcast at startup mode and a normal live broadcast mode. For receiving a live broadcast at startup, transport processor 330 controls the input A/V signal flow (which may consist of MPEG-1 and MPEG-2 video bitstreams, MPEG-1 layer 11 audio bitstreams and digital (AC-3) audio bitstreams for example) received at input port 325. As another function, transport processor 330 may set up PCI I/F 340 for data transfer to downstream decoder or storage components. At this point, SDRAM 315 may operate in what is called a single buffer mode (i.e., HDD 320 is not required for live broadcast at startup).

Further in this mode, transport processor 330 may perform data decrypting and transport processing. For example, the input and already-compressed A/V data of the desired live broadcast may be encrypted. The transport processor contains algorithms that will remove this encryption so that the compressed A/V bit streams may be decoded and displayed on a suitable display device 370. The compressed bit streams are routed to SDRAM 315 via bus 305, and sent to MPEG A/V decoder 352, with the audio portion being sent to AC-3/MPEG audio decoder 356. As previously discussed the decoded video bit streams are converted to analog in video encoder 360 and the decoded audio is converted at DAC 372, prior to display on a suitable display device 370.

Normal live broadcast is effectuated when host processor 310 signifies that it is ready to assume signal flow control from transport processor, which occurs at least after the HDD 320 is ready. Much as when one turns on a laptop or desktop PC, it will take some time (on the order of several seconds to a minute or so, depending on the system load) for the host processor 310 and HDD 320 to go through their respective startup iterations, (i.e., booting-up). There may only be a single input A/V stream in this mode, namely one input stream relative to HDD 320. The compressed bit streams continue to be routed to SDRAM 315 via bus 305. Under the control of host processor 310, the compressed bit streams are transported to HDD 320 for storage (in order to perform various trick modes that are available for live broadcast, simple transitions between modes, etc.) and also conveyed via bus 305 and PCI I/F 340 for decoding prior to display.

Figure 6:
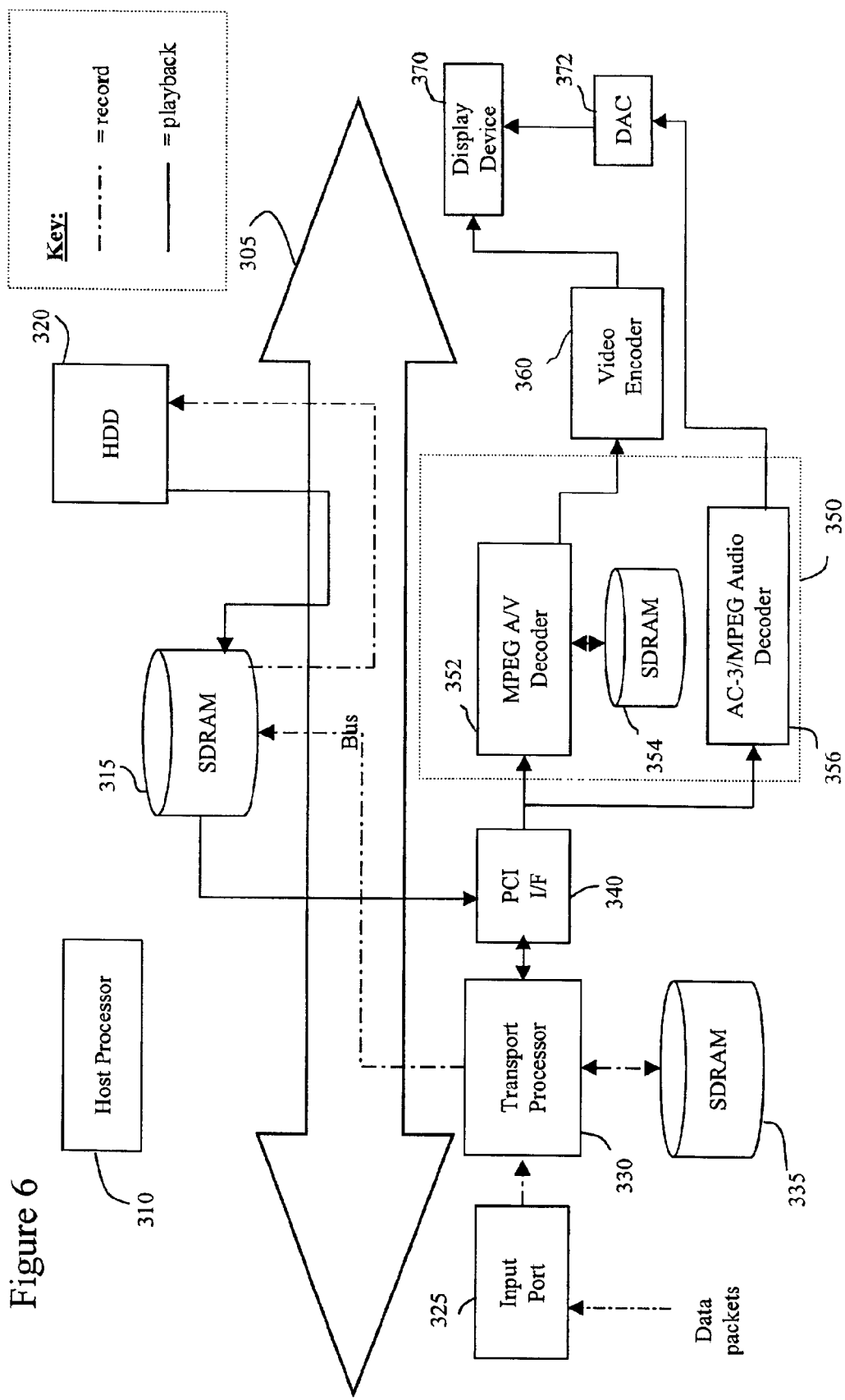
FIG. 6 is a flow diagram showing data flow for recording programs, broadcasts or events for later playback in accordance with an exemplary embodiment of the invention.
Figure 7:
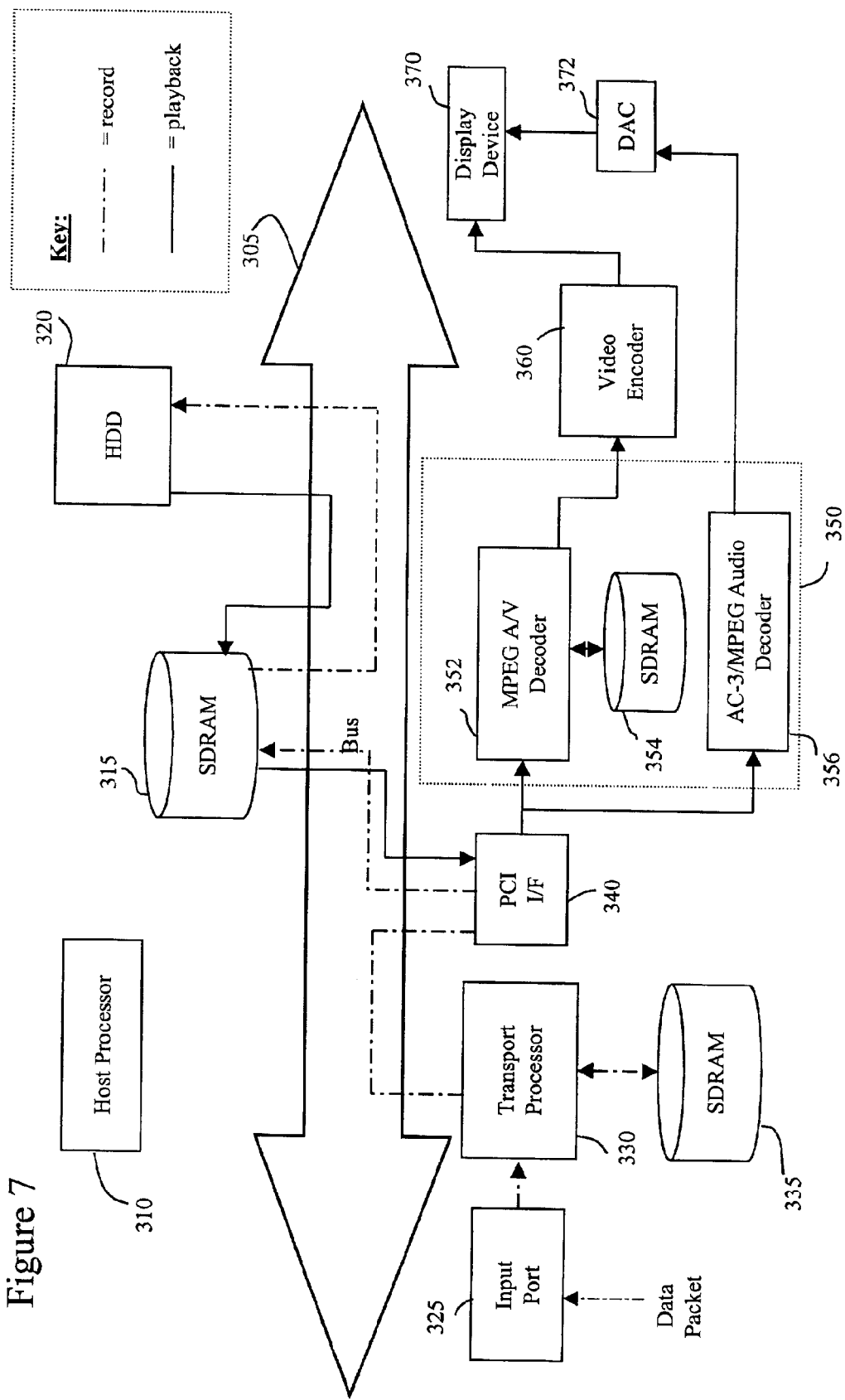
FIG. 7 illustrates an alternative recording path in accordance with the invention.

The recording and playback paths of the STB or STB-equipped with DVR is described in accordance with FIGS. 6 and 7. FIG. 6 shows the recording and playback data flows among the various components of the STB 300. Some of the connections between components, and associated reference numerals from FIG. 3 may have been eliminated in FIGS. 6 and 7 in order to highlight the data flow which is shown using dashed lines (see Key) in FIGS. 6 and 7.

As shown in FIG. 6, A/V data of a selected or desired event, program and/or broadcast is received by input port 325. This may be selected by the viewer manipulating or browsing a menu on display device 370 that is displayed via host processor 310 (acting as a browser with GUI, a non-real time function). This may be performed via a remote control device, whereby the user actuates push buttons or function keys to send a command. The command is typically embodied as an RF or IR signal as is well known in the art, to be received by the STB.

Typically the A/V data is received in packetized form and fed to the transport processor 330. The transport processor 330 then transfers the received A/V data (a real-time function) to SDRAM 315. Digital recording is accomplished by the host processor 310, which transfers the A/V data buffered by SDRAM 315 to the HDD 320. In other words, the SDRAM 315 serves as a buffer which buffers data sent by transport processor 330. This allows the host processor 310 to control the recording onto the HDD 320 when host processor 310 time is available. When a sufficient amount of programming data has been accumulated in the SDRAM 315, the host processor 310 transfers the data from the SDRAM 315 to the HDD 320 for recording therein.

FIG. 7 illustrates an alternative signal path for recording. Audiovisual data is fed from the input port 325 to the transport processor 330. The transport processor 330 then transfers the received audiovisual data to the PCI I/F 340, as indicated by the dashed data flow line. The PCI I/F 340 receives audiovisual data from the transport processor 330 via bus 305, and sends this data to host processor 310, more particularly to SDRAM 315.

Digital recording is accomplished similarly, with SDRAM 315 serving as a buffer that buffers data sent by the PCI I/F 340. This allows the host processor 310 to control the recording (a non-real time function) onto the HDD 320 when processor time is available. When a sufficient amount of A/V data has been accumulated in the SDRAM 315, the host processor 310 transfers the data from the SDRAM 315 to the HDD 320 for recording therein. To record data, the host processor 310 may also inform the PCI I/F 340 of available start addresses in the SDRAM buffer space 315 to which data may be buffered for eventual recording in HDD 320.

The operation of playing back the recorded A/V data that represents a stored event, program, broadcast, etc. in STB 300 is now described. Referring again to FIG. 6, when the viewer turns the STB 300 on, the viewer is given the option to playback any of the previously recorded programs, events, broadcast, etc. This may be done by using remote control or other suitable user command interface as described above (not shown) to access a menu on display device 370. If the viewer selects a desired event, the corresponding A/V data (which typically may also include system time stamps and conditional access packets within the A/V data that are recorded in HDD 320) are retrieved from HDD 320.

In particular, when the user selects the playback option, the selected A/V data recorded on HDD 320 is sent via bus 305 to a queue in SDRAM 315. Next, the buffered data is sent from SDRAM 315 via bus 305 to transport processor 330, back to bus 305 and then to PCI I/F 340, which in turn sends the selected A/V data to decoder 350. Any conditional access is removed (decrypted) by transport processor 330 before the data is then sent to decoder 350. Conditional access packets are used to decrypt the audio and video data in transport processor 330, with the decrypted data being sent to decoder 350 via PCI I/F 340. More specifically, the video portion of the bitstream is sent to MPEG A/V decoder 352, with the audio portion being sent to AC-3/MPEG audio decoder 356.

Transport processor 330 and decoder 350 (in particular MPEG A/V decoder 352), use the recorded time stamps to recreate the original transmission timing of the data. Within decoder 350, MPEG A/V decoder 352 may be provided with an SDRAM 354 in order to more efficiently decode the MPEG bitstream received from PCI I/F 340. SDRAM 354 is similar to SDRAM 315 discussed above in its construction. SDRAM 354 temporarily holds the encoded video bitstream data, and also provides the three frame buffers required for MPEG decoding, as is known in the art. Thereafter, the decoded A/V data is output to video encoder 360 for conversion to an analog format, so that it may be displayed on display device 370. From this point on, the playback data looks, for all intents and purposes, identical to the originally recorded event, program, broadcast, etc.

Therefore, the present invention provides a digital STB 300 having multiple processors for performing specified tasks. A transport processor 330 performs essentially all of the real time operations, such as control of a data pipeline to the STB, and conditional access, for example. A host processor 310 controls essentially all nonreal time functions that are executed within the STB, such as presentation of a graphical user interface (GUI), browser functions, and general interaction with a user of the STB. The STB may be equipped with or embodied as a digital video recorder (DVR) with multiple processors therein, and may be operatively connected to, or embodied within, a digital satellite broadcast system, direct video broadcast system, cable TV system, off-air broadcast system or other known broadcast system.

The addition of one or more processors increases the available system bandwidth of the STB 300. The separate processors executing code in separated memories and/or segmented memory segments, in accordance with the present invention, may also increase system security. Further, the present invention provides greater stability in that if incorrect code or unexpected circumstances disrupt the operation of one processor in the STB or DVR, another processor may continue operation unaffected by the disrupted processor. Moreover, the modular separation between processors encourages the implementation of well-defined interfaces between the various operations running on the STB platform.

The invention being thus described, it will be obvious that the same may be varied in many ways. For example, the present invention has been described in terms of a STB or STB-equipped with DVR having two processors. However, for extended functionality in which a plurality of channels generating a plurality of A/V streams to the input port 325 the bandwidth and processors should be able to handle N simultaneous data streams. To provide such bandwidth, transport processors 330 could be duplicated.

Additionally, the functional blocks in FIGS. 3–7 may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s). Furthermore, the inventive apparatus may be embodied as a variety of ways. A STB 300 is just one example. Other examples include a personal computer (PC), TV or hardware card that is added to an existing apparatus such as a conventional STB, PC or TV. Still further, the inventive functionality may be downloaded or otherwise programmed into a STB, PC or TV. Such variations are not to be regarded as departure from the spirit and scope of the invention, and all such modifications as would be obvious to one skilled in the art are intended to be included within the scope of the following claims.

What is claimed is:

1. A multi-processor digital set top box (STB), comprising:

a first processor configured to execute software instructions and to perform essentially all real time functions within the STB, wherein the real time functions include controlling audiovisual data packets input to the STB, controlling conditional access within said audiovisual data packets, and controlling program guide data input to the STB; and a second processor configured to execute software instructions and to perform essentially all non-real time functions within the STB, wherein the non-real time functions include controlling graphical user interface (GUI) and browser functions to enable a user to send command data to the STB and to manipulate data on a screen of a display that is operatively connected to the STB.

2. The STB according to claim 1, further comprising:

a memory operatively connected to a bus for temporarily storing received audiovisual data packets of a broadcast, wherein each of said first and second processors are also operatively connected to said bus; a recording device for digitally recording said audiovisual data packets, and for transmitting said digitally recorded data packets to said memory; and a decoder for decoding said audiovisual data packets for display on a display device.

3. The STB according to claim 2, wherein the recording device includes at least one mass storage device.

4. The STB according to claim 3, wherein said mass storage device is at least one of a hard disc drive, magnetic storage device or optical storage medium.

5. The STB according to claim 2, wherein said first processor is a transport processor operatively connected to said bus and to an input port for receiving said audiovisual data packets from said input port.

6. The STB according to claim 5, wherein said second processor is a host processor operatively connected to said bus and said memory for performing graphical-user interface (GUI) and browser functions; the STB further comprising:

an interface for receiving said audiovisual data packets from said transport processor, and for transferring said received audiovisual data packets simultaneously to said memory via said bus, and to said decoder, said memory further including a buffer space for temporarily storing the audiovisual data packets received from said interface, said host processor directing said memory to transfer said audiovisual data packets to be digitally recorded by said recording device, and said interface adapted to receive said digitally recorded data packets from said recording device via said memory and said bus.

7. The STB according to claim 6, said interface being further adapted to transfer said digitally recorded data packets to said decoder.

8. The STB according to claim 1, wherein the first processor perform real-time functions while the second processor performs non-real time functions associated with commands received from a user.

9. The STB according to claim 8, wherein said user commands are transmitted to said second processor via a remote control device.

10. The STB according to claim 1, wherein the STB is embodied as a digital video recorder (DVR).

11. A digital video recording (DVR) device, comprising:

a transport processor configured to execute software instructions and to perform essentially all real time functions within the DVR, including controlling audiovisual data packets input to the DVR, controlling conditional access within said audiovisual data packets, and controlling program guide data input to the DVR; and a host processor configured to execute software instructions and to perform essentially all non-real time functions within the DVR, including controlling graphical user interface (GUI) and browser functions to enable a user to send command data to the DVR and to manipulate data on a screen of a display that is operatively connected to the DVR;

wherein the transport processor performs said real time functions while the host processor performs non-real time functions associated with commands that are received from a user.

12. The DVR according to claim 11, further comprising:

a memory operatively connected to a bus for temporarily storing audiovisual data packets of a broadcast that are received from an input port, wherein each of said transport and host processors are also operatively connected to said bus;

a recording device for digitally recording said audiovisual data packets, and for transmitting said digitally recorded data packets to said memory; and a decoder for decoding said audiovisual data packets for display on a display device.

13. The DVR according to claim 12, wherein the recording device includes at least one mass storage device.

14. The DVR according to claim 13, wherein said mass storage device is at least one of a hard disc drive, magnetic storage device or optical storage medium.

15. The DVR according to claim 12, further comprising:

an interface for receiving audiovisual data packets that are sent from said input port to said transport processor, and for transferring said received audiovisual data packets simultaneously to said memory via said bus, and to said decoder, said memory further including a buffer space for temporarily storing the audiovisual data packets received from said interface, said host processor directing said memory to transfer said audiovisual data packets to be digitally recorded by said recording device, and said interface adapted to receive said digitally recorded data packets from said recording device via said memory and said bus.

16. The DVR according to claim 11, wherein said user commands are transmitted to said host processor via a remote control device.

17. The DVR according to claim 11, wherein the DVR is operatively connected to at least one of a direct broadcast satellite system, digital video broadcast system, cable-TV system and off-air broadcast system.

18. A processing method for a digital set top box (STB), comprising:

performing essentially all real time functions in a first processing unit within the STB, wherein the first processing unit is configured to execute software instructions and wherein the real time functions include controlling audiovisual data packets input to the STB, controlling conditional access within said audiovisual data packets, and controlling program guide data input to the STB; and performing essentially all non-real time functions in a second processing unit within the STB, wherein the second processing unit is configured to execute software instructions and wherein the non-real time functions include controlling graphical user interface (GUI) and browser functions to enable a user to send command data to the STB and to manipulate data on a screen of a display that is operatively connected to the STB.

19. The method according to claim 18, further comprising:

temporarily storing received audiovisual data packets of a broadcast that are subject to at least said first processing, wherein each of said first and second processings are performed by communicating with designated components of the STB via a data bus;

digitally recording said received audiovisual data packets that have been subject to said at least first processing and temporarily stored;

retrieving said digitally recorded audiovisual data packets based on at least said second processing; and decoding said retrieved audiovisual data packets for display.

20. A processing method for a digital video recorder (DVR), comprising:

a first processing performed by a first processing unit under software control that includes controlling audiovisual data packets that are received by the DVR, controlling conditional access within said received audiovisual data packets, and controlling program guide data input to the DVR; and a second processing performed by a second processing unit under software control that includes controlling graphical user interface (GUI) and browser functions, thereby enabling a user to send command data to the DVR and to manipulate data on a screen of a display that is operatively connected to the DVR.

21. The method according to claim 20, further comprising:

temporarily storing received audiovisual data packets of a broadcast that are subject to at least said first processing, wherein each of said first and second processings are performed by communicating with designated components of the STB via a data bus;

digitally recording said received audiovisual data packets;

retrieving said digitally recorded audiovisual data packets based on at least said second processing; and decoding said retrieved audiovisual data packets for display on said screen.

22. A system, comprising:

a transmitter for transmitting a content signal, wherein the content signal is digitally encoded and converted to a frequency signal before transmission;

and a set top box (STB) for converting the received frequency signal back into the content signal and for processing the content signal, the STB including:

a first processor configured to execute software instructions and to perform essentially all real time functions associated with the received content signal within the STB, wherein the real time functions include controlling audiovisual data packets input to the STB, controlling conditional access within said audiovisual data packets, and controlling program guide data input to the STB; and a second processor configured to execute software instructions and to perform essentially all non-real time functions associated with the received content signal within the STB, wherein the non-real time functions include controlling graphical user interface (GUI) and browser functions to enable a user to send command data to the STB and to manipulate data on a screen of a display that is operatively connected to the STB.

23. The system of claim 22,
wherein the content signal is embodied as a plurality of audiovisual data packets,
wherein the real time functions performed by the first processor include controlling audiovisual data packets that are received by the STB from the system, controlling conditional access within said received audiovisual data packets, and controlling program guide data input to the STB from the system; and
wherein the non-real time functions performed by the second processor include controlling graphical user interface (GUI) and browser functions that enable a user of the system to send command data to the STB.

24. The system of claim 23, wherein the STB further comprises:
a memory operatively connected to a bus within the STB for temporarily storing said received audiovisual data packets, wherein each of said first and second processors are also operatively connected to said bus;
a recording device for digitally recording said audiovisual data packets, and for transmitting said digitally recorded data packets to said memory; and
a decoder for decoding said audiovisual data packets for display on a display device.

25. A satellite-based distribution system, comprising:
a transmitter for transmitting a content signal, wherein the content signal is digitally encoded and converted to a frequency signal before transmission to a satellite; and
a digital video recorder (DVR) for converting the frequency signal received from the satellite back into the content signal and for processing the content signal, the DVR including:
a first processor configured to execute software instructions and to perform essentially all real time functions associated with the received content signal within the DVR, wherein the real time functions include controlling audiovisual data packets input to the DVR, controlling conditional access within said audiovisual data packets, and controlling program guide data input to the DVR; and
a second processor configured to execute software instructions and to perform essentially all non-real time functions associated with the received content signal within the DVR, wherein the non-real time functions include controlling graphical user interface (GUI) and browser functions to enable a user to send command data to the DVR and to manipulate data on a screen of a display that is operatively connected to the DVR.

26. The system of claim 25,
wherein the content signal is embodied as a plurality of audiovisual data packets,
wherein the real time functions performed by the first processor include controlling audiovisual data packets that are received by the DVR from the system, controlling conditional access within said received audiovisual data packets, and controlling program guide data input to the DVR from the system; and
wherein the non-real time functions performed by the second processor include controlling graphical user interface (GUI) and browser functions that enable a user of the system to send command data to the DVR.

27. The system of claim 26, wherein the DVR further comprises:
a memory operatively connected to a bus within the DVR for temporarily storing said received audiovisual data packets, wherein each of said first and second processors are also operatively connected to said bus;
a recording device for digitally recording said audiovisual data packets, and for transmitting said digitally recorded data packets to said memory; and
a decoder for decoding said audiovisual data packets for display on a display device operatively connected to the DVR.

28. A method of processing data, comprising:
transmitting a content signal received from a signal source, wherein the content signal is digitally encoded and converted to a frequency signal before transmission;
converting the received frequency signal back into the content signal; and processing the received content signal within a set top box (STB), said processing including:
performing essentially all real time functions associated with the received content signal in a first processing unit within the STB, wherein the first processing unit is configured to execute software instructions and wherein the real time functions include controlling audiovisual data packets input to the STB, controlling conditional access within said audiovisual data packets, and controlling program guide data input to the STB; and
performing essentially all non-real time functions associated with the received content signal in a second processing unit within the STB, wherein the second processing unit is configured to execute software instructions and wherein the non-real time functions include controlling graphical user interface (GUI) and browser functions to enable a user to send command data to the STB and to manipulate data on a screen of a display that is operatively connected to the STB.

29. The method of claim 28, the received content signal is embodied as a plurality of audiovisual data packets, the method further comprising:
temporarily storing said received audiovisual data packets that are subject to at least said first processing, wherein each of said first and second processings are performed by communicating with designated components of the STB via a data bus;
digitally recording said received audiovisual data packets that have been subject to said at least first processing and temporarily stored;
retrieving said digitally recorded audiovisual data packets based on at least said second processing; and decoding said retrieved audiovisual data packets for display.

30. A processing method within a satellite-based distribution system, comprising:
transmitting a content signal received from a signal source, wherein the content signal is digitally encoded and converted to a frequency signal before transmission to the satellite; and
converting the frequency signal received from the satellite back into the content signal and processing the content signal within a digital video recorder (DVR), said processing including:
performing essentially all real time functions associated with the received content signal in a first processing unit within the DVR, wherein the first processing unit is configured to execute software instructions and wherein the real time functions include controlling audiovisual data packets input to the DVR, controlling conditional access within said audiovisual data packets, and controlling program guide data input to the DVR; and performing essentially all non-real time functions associated with the received content signal in a second processing unit within the DVR, wherein the second processing unit is configured to execute software instructions and wherein the non-real time functions include controlling graphical user interface (GUI) and browser functions to enable a user to send command data to the DVR and to manipulate data on a screen of a display that is operatively connected to the DVR.

31. The method of claim 30,
wherein the content signal is embodied as a plurality of audiovisual data packets,
wherein the real time functions performed by said first processing include controlling audiovisual data packets that are received by the DVR from the system, controlling conditional access within said received audiovisual data packets, and controlling program guide data input to the DVR from the system; and
wherein the non-real time functions performed by said second processing include controlling graphical user interface (GUI) and browser functions that enable a user of the system to send command data to the DVR.

32. The method of claim 31, further comprising:
temporarily storing said received audiovisual data packets that are subject to at least said first processing, wherein each of said first and second processings are performed by communicating with designated components of the DVR via a data bus;
digitally recording said received audiovisual data packets that have been subject to said at least first processing and temporarily stored;
retrieving said digitally recorded audiovisual data packets based on at least said second processing; and
decoding said retrieved audiovisual data packets for display.

33. A transmission system, comprising:
a transmitter for transmitting a content signal, wherein the content signal is digitally encoded and converted to a frequency signal before transmission, converted back into the content signal upon reception and processed by performing in a first processing unit executing software instructions essentially all real time functions associated with the content signal, separate from essentially all non-real time functions performed in a second processing unit executing software instructions associated with the content signal, wherein the real time functions include controlling audiovisual data packets, controlling conditional access within said audiovisual data packets, and controlling program guide data, and wherein the non-real time functions include controlling graphical user interface (GUI) and browser functions to enable a user to send command data to manipulate data on a screen of a display.

34. The transmission system of claim 33,
wherein the content signal is embodied as a plurality of audiovisual data packets,
wherein the real time functions include controlling audiovisual data packets that are received, controlling conditional access within said received audiovisual data packets, and controlling program guide data; and
wherein the non-real time functions include controlling graphical user interface (GUI) and browser functions.

35. A satellite-based transmission system, comprising:
a transmitter for transmitting a content signal, wherein the content signal is digitally encoded and converted to a frequency signal before transmission, converted back into the content signal upon reception and processed by performing in a first processing unit executing software instructions essentially all real time functions performed in a second processing unit executing software instructions associated with the content signal, separate from essentially all non-real time functions associated with the content signal, wherein the real time functions include controlling audiovisual data packets, controlling conditional access within said audiovisual data packets, and controlling program guide data, and wherein the non-real time functions include controlling graphical user interface (GUI) and browser functions to enable a user to send command data to manipulate data on a screen of a display.

36. The satellite-based transmission system of claim 35,
wherein the content signal is embodied as a plurality of audiovisual data packets wherein the real time functions include controlling audiovisual data packets that are received, controlling conditional access within said received audiovisual data packets, and controlling program guide data; and
wherein the non-real time functions include controlling graphical user interface (GUI) and browser functions.

37. A method of processing data, comprising:
transmitting a content signal, wherein the content signal is digitally encoded and converted to a frequency signal before transmission, converted back into the content signal upon reception and processed by performing in a first processing unit executing software instructions essentially all real time functions associated with the content signal, separate from essentially all non-real time functions performed in a second processing unit executing software instructions associated with the content signal, wherein the real time functions include controlling audiovisual data packets, controlling conditional access within said audiovisual data packets, and controlling program guide data, and wherein the non-real time functions include controlling graphical user interface (GUI) and browser functions to enable a user to send command data to manipulate data on a screen of a display.

38. The method according to claim 37, wherein said real time functions include controlling audiovisual data packets, controlling conditional access within said audiovisual data packets, and controlling program guide data.

39. The method according to claim 37, wherein said non-real time functions include controlling graphical user interface (GUI) and browser functions, thereby enabling a user to enter command data and to manipulate data on a screen of a display.

40. A processing method within a satellite-based distribution system, comprising:
transmitting a content signal, wherein the content signal is digitally encoded and converted to a frequency signal before transmission, converted back into the content signal upon reception and processed by performing in a first processing unit executing software instructions essentially all real time functions performed in a second processing unit executing software instructions associated with the content signal, separate from essentially all non-real time functions associated with the content signal, wherein the real time functions include controlling audiovisual data packets, controlling conditional access within said audiovisual data packets, and controlling program guide data, and wherein the non-real time functions include controlling graphical user interface (GUI) and browser functions to enable a user to send command data to manipulate data on a screen of a display.

41. The method of claim 40, wherein said real time functions include controlling audiovisual data packets, controlling conditional access within said audiovisual data packets, and controlling program guide data.

42. The method of claim 41, further comprising decoding said retrieved audiovisual data packets for display.

* * * * *